US007468015B2

(12) United States Patent
Hirata et al.

(10) Patent No.: US 7,468,015 B2
(45) Date of Patent: Dec. 23, 2008

(54) METHOD FOR MANUFACTURING A VARIATOR COMPONENT OF CONTINUOUSLY VARIABLE TRANSMISSION, AND VARIATOR COMPONENT OF CONTINUOUSLY VARIABLE TRANSMISSION

(75) Inventors: Kiyotaka Hirata, Kanagawa (JP); Hiroyuki Ikeda, Saitama (JP)

(73) Assignee: NSK Ltd., Tokyo (JP)

( * ) Notice: Subject to any disclaimer, the term of this patent is extended or adjusted under 35 U.S.C. 154(b) by 575 days.

(21) Appl. No.: 10/914,279

(22) Filed: Aug. 10, 2004

(65) Prior Publication Data
US 2005/0070400 A1  Mar. 31, 2005

(30) Foreign Application Priority Data
Aug. 11, 2003  (JP)  ............ P.2003-291257

(51) Int. Cl.
*F16H 15/38* (2006.01)
(52) U.S. Cl. ........................ 476/42; 476/73

(58) Field of Classification Search ............ 476/40, 476/42, 73, 72; 415/47, 54, 57, 209, 253
See application file for complete search history.

(56) References Cited

U.S. PATENT DOCUMENTS

| | | | |
|---|---|---|---|
| 6,071,210 A * | 6/2000 | Kato et al. | 476/42 |
| 6,261,203 B1 | 7/2001 | Shimizuya et al. | |
| 6,347,980 B1 | 2/2002 | Kamamura et al. | |
| 6,572,452 B2 | 6/2003 | Hatase et al. | |
| 6,637,107 B2 | 10/2003 | Yasuhara et al. | |
| 6,663,471 B2 * | 12/2003 | Kamamura et al. | 451/47 |
| 6,893,376 B2 * | 5/2005 | Hatase et al. | 476/73 |
| 6,979,247 B1 * | 12/2005 | Ido | 451/8 |

FOREIGN PATENT DOCUMENTS

| | | |
|---|---|---|
| JP | 2000-61702 A | 2/2000 |
| JP | 2000-233367 A | 8/2000 |
| JP | 2004-34229 A | 2/2004 |

* cited by examiner

*Primary Examiner*—David M Fenstermacher
(74) *Attorney, Agent, or Firm*—Sughrue Mion, PLLC (57) ABSTRACT

A method for manufacturing a variator component of a continuously variable transmission having a plurality of cylindrical sections and a plurality of ball spline grooves, which are provided alternately in an inner radial region of the variator component. The method includes: simultaneously finishing the cylindrical sections and the ball spline grooves through use of a hard broaching tool; and finishing functional surfaces provided on side surfaces of the variator component while taking the cylindrical sections as a machining reference.

1 Claim, 7 Drawing Sheets

METHOD FOR MANUFACTURING A VARIATOR COMPONENT OF CONTINUOUSLY VARIABLE TRANSMISSION, AND VARIATOR COMPONENT OF CONTINUOUSLY VARIABLE TRANSMISSION

BACKGROUND OF THE INVENTION

1. Field of the Invention

The present invention relates to a method for manufacturing a variator component of continuously variable automobile transmission, as well as to a variator component of the continuously variable transmission.

2. Background Art

In general, an input disk of a toroidal-type continuously variable transmission constitutes a ball spline disposed between the input disk and an input shaft to which rotation is transferred from the engine. The input disk can rotate in synchronism with the input shaft and can be moved in an axial direction of the input shaft. The ball spline is formed by means of placing ball spline grooves formed in the input shaft so as to oppose ball spline grooves formed in the input disk, and accommodating balls between the mutually-opposing ball spline grooves, whereby the input disk is engaged with the input shaft.

As mentioned above, the input disk is driven by way of the ball spline grooves formed in an inner radial region of the input disk and rotate around the center of the ball spline groove sections. Therefore, a toroidal surface and a cam surface, which are functional surfaces of the input disk, must be machined with high coaxiality with respect to the ball spline grooves which serve as a rotational reference. If the coaxiality between the functional surfaces and the ball spline grooves is low, contact of the toroidal surface with a power roller which transmits torque will become unstable, or pressing force developing in the cam surface will become unstable.

At the time of manufacture of the input disk, a blank is formed, through hot forging, into a general shape having a finished dimension with a machine allowance. The blank is then subjected to cutting work, whereby the blank is machined into a shape having an optimum allowance determined in consideration of heat processing distortion. In particular, in the case of a component having ball spline grooves formed in an inner radius region thereof, the shape and dimension of the inner radius region are formed through broaching.

After the blank formed through cutting work has been subjected to heat treatment and then cured, the ball spline grooves are subjected to finishing. A technique for chucking an outer radial surface of the blank as a machining reference and grinding the ball spline grooves one by one has been known as a finishing technique (see, e.g., JP-A-2000-233367).

In addition to this grinding technique, there has also been known a method for finishing the ball spline grooves through use of a hard broaching tool (see, e.g., U.S. Pat. Nos. 6,071,210 and 6,637,107). According to U.S. Pat. No. 6,637,107, a functional surface, such as a toroidal surface or a cam surface, is finished through grinding or turning while the finished ball spline grooves are taken as a machining reference.

SUMMARY OF THE INVENTION

However, according to the finishing method described in JP-A-2000-233367, when the ball spline grooves are ground, a grindstone for use in a ball spline groove must have a size such that the grindstone enters the inner radius region of the component. Hence, the grindstone eventually becomes comparatively small. For this reason, the grindstone tool has low rigidity and yields low machining efficiency. Moreover, the ball spline grooves are machined one by one, which lengthens machining time and adds to machining costs.

In the case of the method described in U.S. Pat. No. 6,637,107, in a process for finishing functional surfaces of the toroidal surfaces, the ball spline grooves must be retained as a machining reference by means of chucking. Hence, there may be a case where the ball spline grooves are flawed as a result of biting of extraneous matter, thereby rendering the ball spline grooves defective. Moreover, a chucking machine for chucking the ball spline grooves requires special design and manufacturing, which is accompanied by an increase in the cost of equipment and machining costs.

The present invention aims at providing a method for manufacturing a variator component of a continuously variable transmission, which enables a reduction in manufacturing costs while maintaining the accuracy of coaxiality among cylindrical sections of an inner radius region, ball spline grooves, and functional surfaces and machining of functional surfaces without inflicting damage on the ball spline grooves, as well as providing a variator component of the continuously variable transmission.

The above object is achieved by the following configurations:

(1) A method for manufacturing a variator component of a continuously variable transmission having a plurality of cylindrical sections and a plurality of ball spline grooves, which are provided alternately in an inner radial region of the variator component, the method comprising the steps of:

simultaneously finishing the cylindrical sections and the ball spline grooves through use of a hard broaching tool; and finishing functional surfaces provided on side surfaces of the variator component while taking the cylindrical sections as a machining reference.

(2) The method for manufacturing a variator component of a continuously variable transmission defined in (1), wherein before finishing is performed through use of the hard broaching tool, a recess section which is not subjected to finishing operation performed by the hard broaching tool is formed in at least a portion of the cylindrical sections.

(3) A variator component of a continuously variable transmission manufactured by the method defined in (1), wherein the variator component has an inner radial region where a plurality of cylindrical sections and a plurality of ball spline grooves are alternately arranged, as well as a side surface having a functional surface provided thereon; and wherein a recess section which is not subjected to finishing operation performed by the hard broaching tool is formed in at least one of the cylindrical sections.

(4) The variator component of a continuously variable transmission defined in (3), wherein the variator component is an input disk of a toroidal-type continuously variable transmission, and the functional surface is at least either a toroidal surface or a cam surface.

(5) The variator component of a continuously variable transmission defined in (3), wherein the variator component is a pulley of a belt-type continuously variable transmission, and the functional surface is a pulley surface.

According to the method for manufacturing a variator component of a continuously variable transmission and the variator component of the continuously variable transmission, both pertaining to the present invention, the cylindrical sections and the ball spline grooves are concurrently finished through use of the hard broaching tool, thereby making manufacturing costs low. Moreover, the functional surfaces provided on the side surfaces of the variator component are finished while the cylindrical sections having the accuracy of coaxiality with respect to the ball spline grooves are taken as a machining reference. Hence, the functional surfaces can be machined without inflicting damage on the ball spline grooves.

Further, the recess section which is not subjected to finishing operation performed by the hard broaching tool is provided in at least a portion of the cylindrical sections. Hence, there can be prevented beating vibration, which would otherwise be caused during a finishing operation performed through use of the hard broaching tool, as well as a decrease in surface roughness of the variator component and the life of the cutting tool, which would otherwise be caused by beating vibration. Hence, cost reduction can be achieved. The recess section may be formed in a portion of each of the cylindrical sections (i.e., a recess groove in an embodiment), or the entirety of each of the cylindrical portions may be formed into a recess section (i.e., a second cylindrical section in the embodiment). When the entire surface of some of a plurality of the cylindrical sections is a recess section which is not finished by the hard broaching tool, the remaining cylindrical sections are finished with the hard broaching tool.

BRIEF DESCRIPTION OF THE DRAWINGS

The present invention may be more readily described with reference to the accompanying drawings:

FIGS. 2A and 2B show the input disk of the toroidal-type continuously variable transmission, wherein

DETAILED DESCRIPTION OF THE PREFERRED EMBODIMENTS

A method for manufacturing a variator component of a continuously variable transmission and a variator component of a continuously variable transmission, both pertaining to a first embodiment of the present invention, will be described in detail by reference to the drawings.

Figure 1:
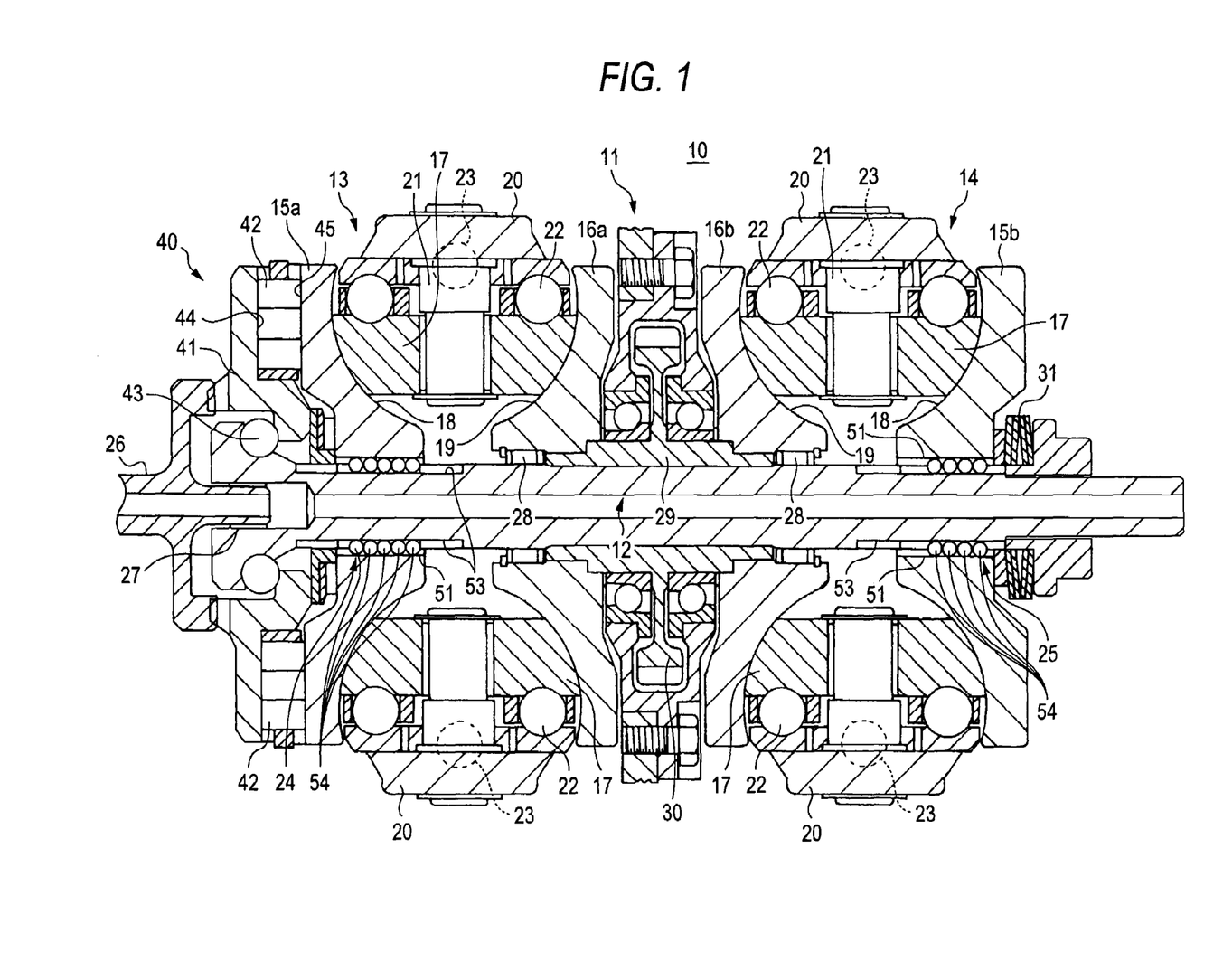
FIG. 1 is a schematic cross-sectional view showing a double cavity toroidal-type continuously variable transmission equipped with input disks which are variator components of the present invention.
Figure 2A:
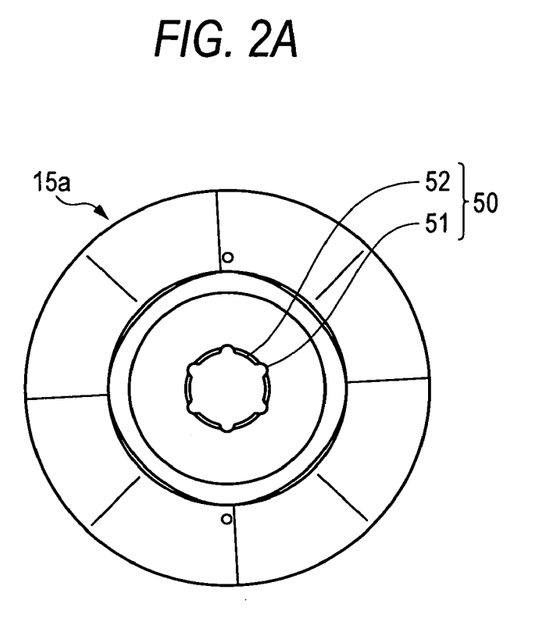
FIG. 2A is a front view of the input disk.
Figure 2B:
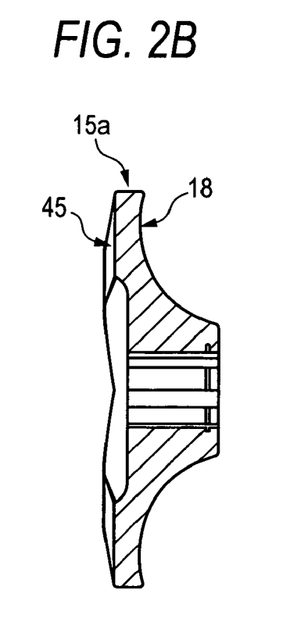
FIG. 2B is a cross-sectional view of the same.
Figure 3:
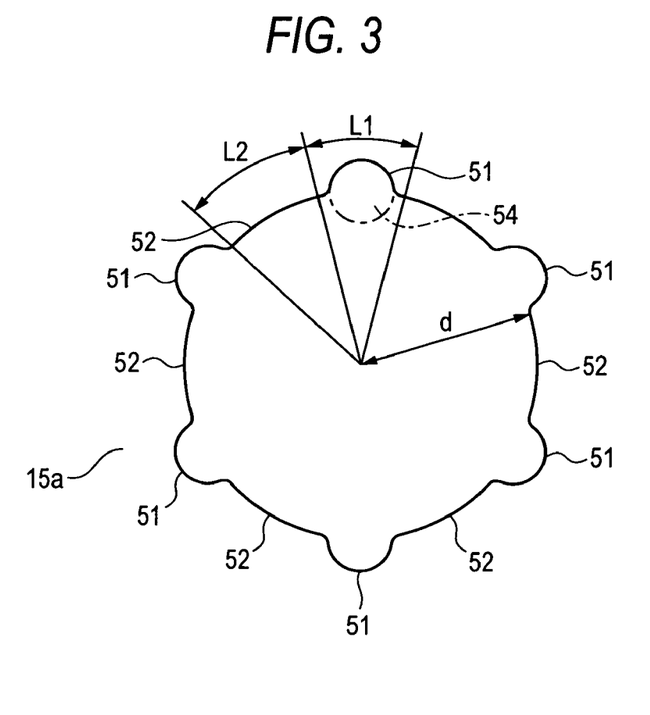
FIG. 3 is an enlarged view of the principal section showing an inner diameter section of the input disk.
Figure 4:
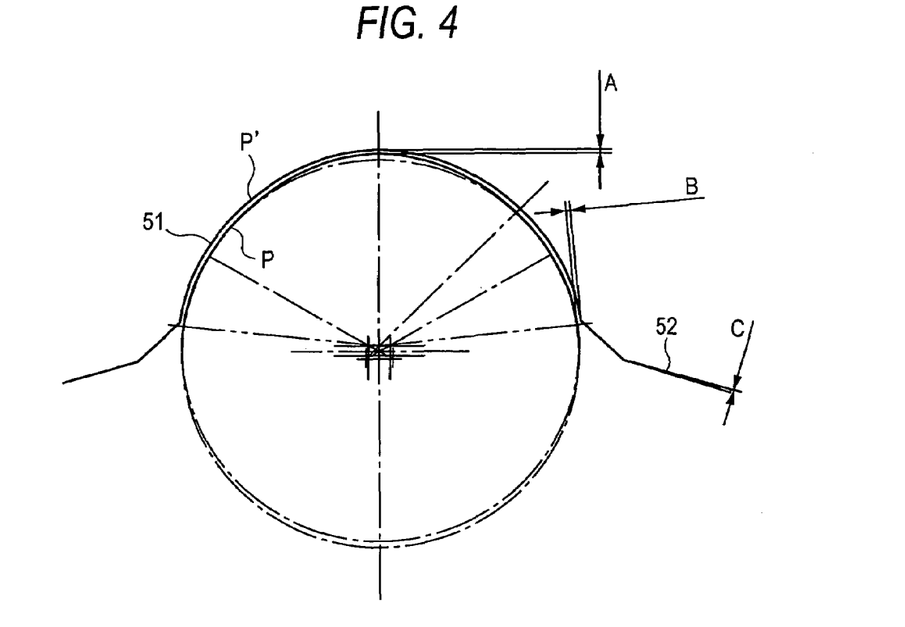
FIG. 4 is an enlarged view of a ball spline groove showing an allowance to be used for finishing operation.
Figure 5A:
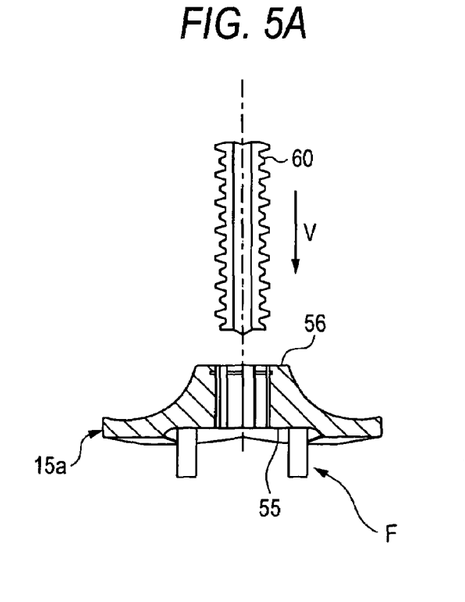
FIGS. 5A and 5B are views showing finishing processes using a hard broaching tool.
Figure 5B:
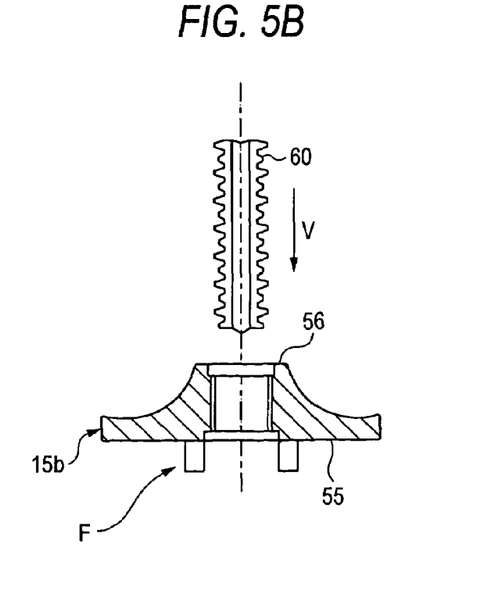

FIG. 1 is a schematic cross-sectional view showing a double-cavity-toroidal-type continuously variable transmission having an input disk which is a variator component of the present invention. FIG. 2 shows the input disk of the toroidal-type continuously variable transmission, wherein FIG. 2A is a front view of the input disk, and FIG. 2B is a cross-sectional view of the same. FIG. 3 is an enlarged view of the principal section showing an inner radius region of the input disk. FIG. 4 is an enlarged view of a ball spline slit showing a cutting allowance to be used when finishing operation is performed through use of a hard broaching tool. FIGS. 5A, 5B are views showing finishing processes performed with the hard broaching tool.

By reference to FIG. 1, a variator 11 of a toroidal-type continuously variable transmission 10 has a first cavity 13 and a second cavity 14 provided around an input shaft 12 which rotates in synchronism with a driving source, such as the engine. The first cavity 13 has an input disk 15a, an output disk 16a, and a pair of power rollers 17 rotatably sandwiched between the input disk 15a and the output disk 16a. The second cavity 14 has an input disk 15b, an output disk 16b, and a pair of power rollers 17 rotatably sandwiched between the input disk 15b and the output disk 16b.

A toroidal surface 18 doubling as a functional surface of the present invention is provided on respective inside surfaces of the input disks 15a, 15b, and the toroidal surface 18 is formed into a circular-arc, concave cross-sectional profile. A toroidal surface 19 formed into a circular-arc, concave cross-sectional profile is provided on respective inside surfaces of the output disks 16a, 16b. An outer peripheral surface of each power roller 17 is formed into a spherically-convex surface. The spherically-convex surfaces of the power rollers come into contact with the toroidal surfaces 18, 19 formed in each of the input disks 15a, 15b and the output disks 16a, 16b.

Each of the power rollers 17 is rotatably supported around a displacement shaft 21 supported by a trunnion 20 and arranged on an inner surface side of the trunnion 20 through a power roller bearing 22. The trunnion 20 is swingable around a corresponding trunnion shaft 23, thereby adjusting a tilt angle of the displacement shaft 21. Accordingly, positions where the power roller 17 comes into contact with the respective toroidal surfaces 18, 19 are changed in accordance with a tilt angle of the displacement shaft 21.

The input disks 15a, 15b are attached to the input shaft 12 so as to be movable in the axial direction of the input shaft 12 while being locked around the input shaft 12 by means of ball splines 24, 25 and rotated along with the input shaft 12. The input shaft 12 is coupled, in a rotatable manner, to a drive shaft 26 which is rotated by means of a drive source, such as the engine, by way of bearings 27.

The output disks 16a, 16b are interposed between the input disks 15a, 15b. The output disks 16a, 16b are supported by the input shaft 12 in a rotatable manner by way of bearings 28. The output disks 16a, 16b are coupled together by means of a coupling member 29 and rotate synchronously. The coupling member 29 is provided with an output gear 30, and the output gear 30 rotates in conjunction with an output shaft (not shown).

An annular disc spring 31 is provided as a resilient member on the back of the input disk 15b. The disc spring axially presses the back of the input disk 15b with predetermined impelling force, thereby imparting pressing force (pre-load) at no load, which causes the input disks 15a, 15b and the output disks 16a, 16b to sandwich the power rollers 17.

A loading cam mechanism 40 functioning as a pressing mechanism is provided on the back of the input disk 15a. The loading cam mechanism 40 includes a cam disk 41 and a roller 42. The cam disk 41 is rotatably supported on the input shaft 12 by way of a ball bearing 43. Cam surfaces 44, 45 are formed on mutually-opposing surfaces of the cam disk 41 and the input disk 15a, respectively. The roller 42 is sandwiched between the cam surfaces 44, 45. The cam surface 45 of the input disk 15a constitutes a functional surface of the present invention.

When the drive shaft 26 is rotated while the roller 42 is sandwiched between the cam surfaces 44, 45, the cam disk 41 rotates, whereby the input disk 15a is pressed toward the output disk 16a, and the input disk 15a rotates along with the cam disk 41. Reaction force exerted on the cam disk 41 is applied to the input shaft 12 by way of the ball bearing 43. Hence, the input disk 15b is pressed toward the output disk 16b. The input disks 15a, 15b are rotated by means of the rotational force of the engine transmitted from the drive shaft 26 to the cam disk 41. Thereby, rotation of the input disks 15a, 15b is transmitted to the output disks 16a, 16b by way of the power rollers 17, thereby rotating the output gear 30. By means of changing tilt angles of the power rollers 17, the power rollers 17 change positions at which the input disks 15a, 15b come into contact with the output disks 16a, 16b. A desired rotational speed ratio (i.e., a transmission ratio) is, in a stepless manner, applied between the input shaft 12 and the output shaft.

As shown in FIG. 2, the input disk 15a has on one side thereof the toroidal surface 18 acting as a functional surface of the present invention and has on the other side thereof the cam surface 45 of the loading cam mechanism acting as a functional surface of the present invention. Ball spline grooves 51 and cylindrical sections 52 are alternately formed along the circumferential direction of an inner radial section 50 of the input disk 15a (see FIG. 3). Each of the ball spline grooves 51 constitutes the ball spline 24 and has a circular-arc length L1, and the cylindrical section 52 has a circular-arc length L2 and a radius "d."

A plurality of the ball spline grooves 51 (six slots in the embodiment) are axially formed so as to oppose ball spline grooves 53 (see FIG. 1) formed in the outer peripheral surface of the input shaft 12. A plurality of balls 54 are housed between the mutually-opposing ball spline grooves, thereby constituting ball splines between the input shaft 12 and the input disk 15a. The essential requirement for the ball spline groove 51 is that a plurality of the ball spline grooves 51 be formed. Two to six ball spline grooves are preferable. The cross-sectional profile of the ball spline groove 51 may also assume the shape of a Gothic Arc or a single circular-arc shape.

The input disk 15a—which is a variator component of the present invention—is formed into a shape/side P by subjecting to broach machining, before heat treatment, a molded article of rough shape imparted with a machining allowance, wherein an appropriate cutting allowance to be removed through finishing is imparted to the ball spline grooves and the cylindrical sections. Specifically, as shown in FIG. 4, the allowance of the inner radial section 50 of the input disk 15a is set to a shape/size P. The shape/size P is determined by means of adding, to a shape P' achieved through finishing through use of the hard broaching tool, a cutting allowance A on the bottom of the ball spline groove 51, a cutting allowance B on a shoulder section of the ball spline groove 51, and a cutting allowance C on the cylindrical section 52.

After the input disk 15a has been hardened by means of a method, such as heat treatment or the like, a large end face 55 of the input disk 15a is placed at a machining reference F, as shown in FIG. 5A. Then, the inner radial section 50 is finished by means of a hard broaching tool 60. The outer periphery of the hard broaching tool 60 is set to a dimension for finishing the inner radius section 50, and the hardbroaching tool 60 is manufactured sufficiently harder than the input disk 15a. The hard broaching tool 60 is opposed to the input disk 15a in a finishing operation and penetrates through and cuts the inner radius section 50 of the input disk 15a at a predetermined relative cutting speed V. In the hard broaching tool 60, a cutting tooth for machining a ball spline groove and a cutting tooth for machining a cylindrical section are formed integrally. The cylindrical sections 52 and the ball spline grooves 51 are simultaneously finished by one through-cutting operation. The relative cutting speed V is experimentally determined from the shape and material of the hard broaching tool and the hardness and material of the input disk serving as a workpiece.

Accordingly, the inner radial section 50 having a high coaxially is formed by means of simultaneously finishing the cylindrical sections 52 and the ball spline grooves 51 through use of the hard broaching tool 60. Subsequently, the toroidal surface 18 and the cam surface 19, which are the functional surfaces, are finished by means of turning or grinding while the cylindrical section 52 is taken as a machining reference.

Figure 6A:
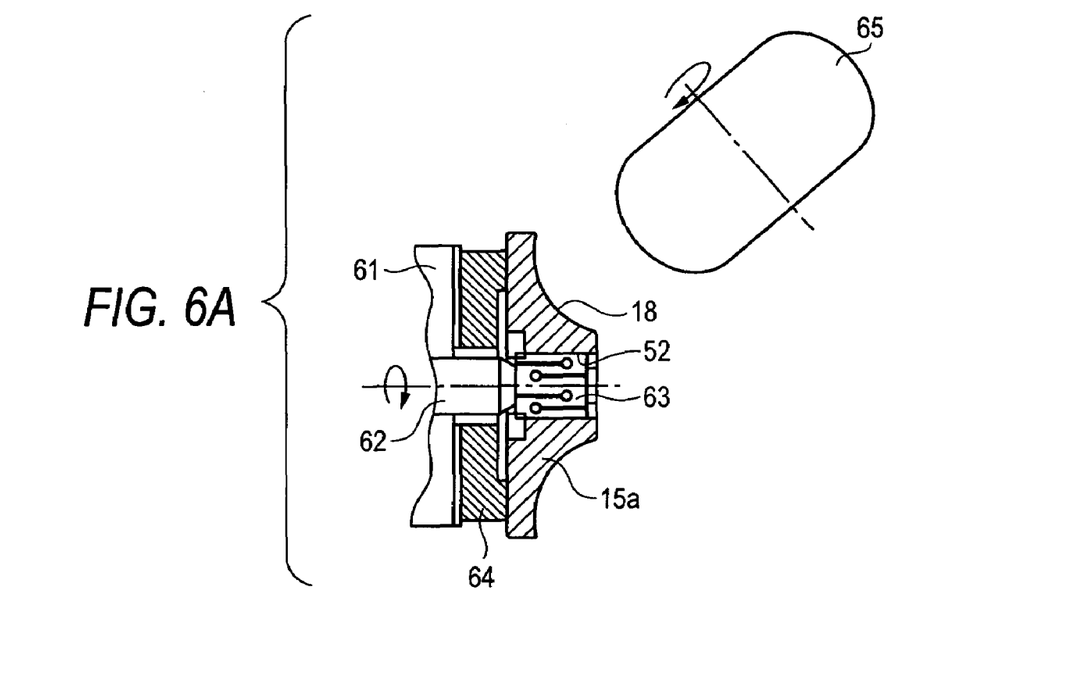
FIGS. 6A and 6B are views showing processes for machining a toroidal surface while an inner radius section is taken as a machining reference.
Figure 6B:
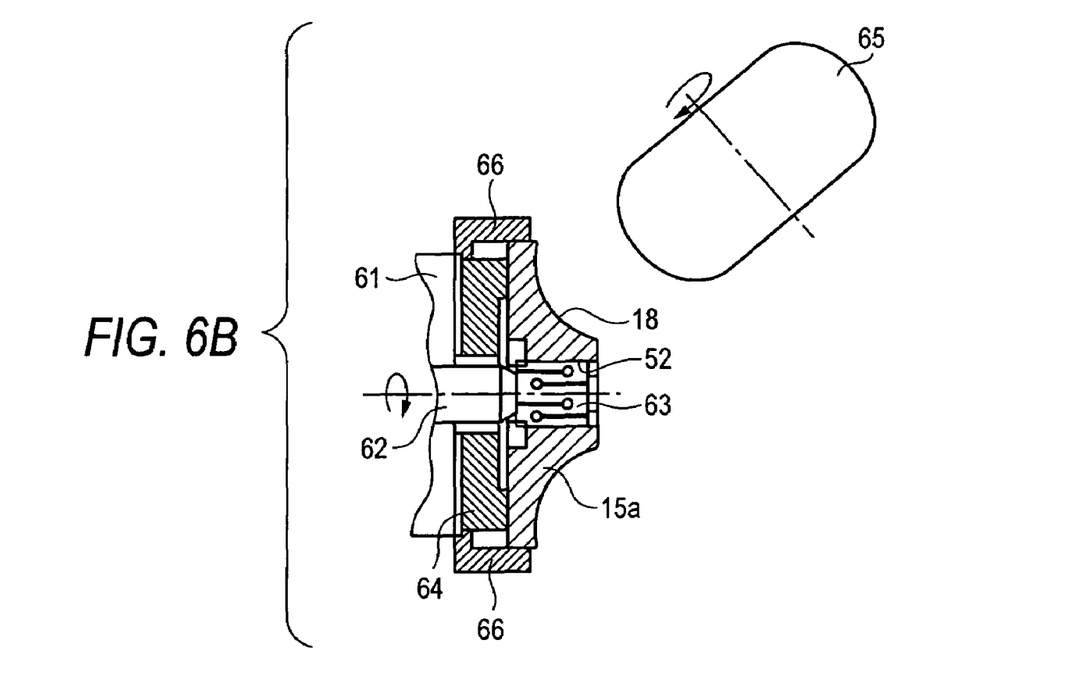

For instance, when the toroidal surface 18 is finished, the cylindrical section 52 is centered and gripped by means of an inner-diameter collet chuck 63 attached to a main shaft 62 of a grinding machine 61, as shown in FIG. 6A. The toroidal surface 18 is turned by means of a grindstone 65 for grinding a toroidal surface while the back of the input disk 15a is butted against a reference washer 64. Moreover, when grinding resistance is large at the time of grinding operation, a plurality of floating outer-diameter chucks 66 may be provided at a plurality of locations on the outer diameter section of the input disk 15a, as shown in FIG. 6B, thereby assisting the gripping force of the inner-radius collet chuck 63. Even in this case, the inner diameter section 52 is taken as a machining reference, and the floating outer-diameter chuck 66 generates only gripping force.

When the input disk 15b having no cam surface on the back thereof is machined, the input disk 15b is subjected to broaching such that the inner diameter section of the input disk 15b is formed into a shape/size having an appropriate cutting allowance and then hardened through heat treatment, as in the case of the input disk 15a. As shown in FIG. 5B, the cylindrical sections 52 and the ball spline grooves 51 are simultaneously machined at the predetermined relative cutting speed V through use of the hard broaching tool 60 while the large end face 55 is placed on the machining reference F. Subsequently, as shown in FIG. 6A, 6B, the toroidal surface 19 serving as functional surfaces is finished through turning and grinding while the cylindrical sections 52 are taken as the machining reference.

In the finishing operation performed by the hard broaching tool 60, the large end faces 55 of the input disks 15a, 15b are placed on the machining reference F, and the hard broaching tool 60 is inserted into the input disks from a small end faces thereof. Alternatively, small end faces 56 of the input disks 15a, 15b may be placed on the machining reference F, and the hard broaching tool 60 inserted into the large end faces of the input disks 15a, 15b, thereby finishing the toroidal surfaces 19.

According to the present embodiment, the cylindrical sections 52 and the ball spline grooves 51 are simultaneously machined through use of the hard broaching tool 60 having a cutting tooth for a cylindrical section and a cutting tooth for a ball spline groove. As a result, the accuracy of coaxiality of the hard broaching tool 60 is transferred to the input disks 15a, 15b, which are variator components. Thus, the cylindrical sections 52 and the ball spline grooves 51, both belonging to each disk, can be machined with a high degree of coaxiality.

In particular, when the hard broaching tool 60 is manufactured, a single area is used as a machining reference to be used for manufacturing a cutting tooth for a cylindrical section and a cutting tooth for a ball spline groove. Hence, the respective cutting teeth of the hard broaching tool 60 have a very high degree of coaxiality. Accordingly, the coaxiality of the variator components—onto which the coaxiality of the hard broaching tool 60 is transferred through finishing—becomes highly superior.

As a result of the hard broaching tool 60 being used for finishing, a plurality of ball spline grooves can be machined simultaneously, thereby shortening a machining time as compared with a time required for conventional grinding operation, and hence curtailing machining costs.

When the functional surfaces; i.e., the toroidal surfaces and the cum surfaces, are machined, the cylindrical sections that have been machined coaxially with the ball spline grooves are gripped. Hence, there can be prevented occurrence of flaws, or the like, in the ball spline grooves which would otherwise be caused when extraneous matter is bitten according to the conventional method involving grasping of the ball spline grooves. Further, there is no necessity for grasping the ball spline grooves. Hence, a special chucking apparatus is not required, thereby lowering the price of machining equipment. This in turn enables a reduction in machining costs.

Figure 7:
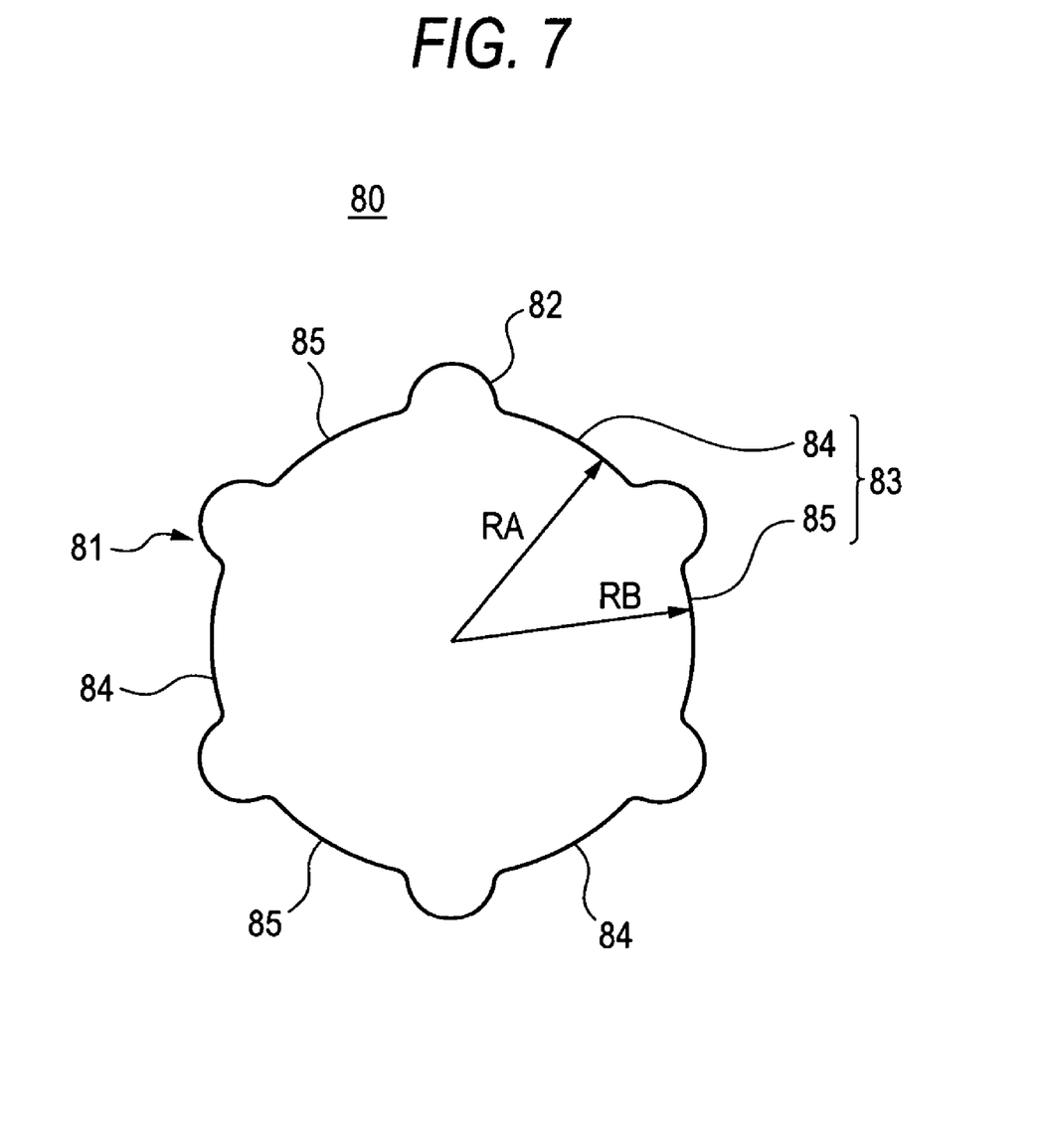
FIG. 7 is an enlarged view of the principal section showing an inner radius section of a variator component according to a second embodiment of the present invention.

Next, a method for manufacturing a variator component of a continuously variable transmission and a variator component of a continuously variable transmission, both pertaining to a second embodiment of the present invention, will now be described by reference to FIG. 7. FIG. 7 is an enlarged view of the principal section, showing an inner radial section of an input disk which is the variator component of the present invention.

A plurality of axially-extending ball spline grooves 82 (six slots in the present embodiment) and cylindrical sections 83 are alternately formed along the circumferential direction of an inner radial section 81 of an input disk 80 shown in FIG. 7. The cylindrical section 83 has a first cylindrical section 84 having a radius RA to be finished by the hard broaching tool 60, and a second cylindrical section 85 having a radius RB—which is larger than the radius RA and is not to be finished by the hard broaching tool 60—as well as serving as a recess section. The first cylindrical section 84 and the second cylindrical section 85 are alternately provided in the circumferential direction with the ball spline groove 82 being provided as a border between the first cylindrical sections 84 and the second cylindrical sections 85. The second cylindrical sections 85 are formed by means of broaching before heat treatment and reduce cutting resistance, which would otherwise be caused during a finishing operation performed by means of the hard broaching tool. When the functional surfaces, such as the toroidal surfaces, are machined after the ball spline grooves 82 and the first cylindrical sections 84 have been finished, cutting or grinding operation is performed while the first cylindrical sections 84 finished by the hard broaching tool 60 are taken as a machining reference.

By means of the configuration, the second cylindrical section 85 which is not finished by the hard broaching tool 60 is provided in a part of the cylindrical section 83. Hence, the cutting resistance arising during the finishing operation can be reduced, and occurrence of beating vibration or the like, which would otherwise be caused by finishing operation, can be inhibited.

The input disk 80 to be finished by the hard broaching tool 60 is hardened by heat treatment, and hence resultant cutting resistance becomes greater than that stemming from cutting of the non-hardened input disk 80 before heat treatment. Therefore, the variator is likely to cause beating vibration at the time of finishing operation. The cutting resistance is dependent on a circumferential length to be cut; that is, the total of the outer peripheral length of the cylindrical sections and that of the ball spline grooves in the present embodiment. Therefore, in the present embodiment, the number of cylindrical sections 83 to be finished by the hard broaching tool 60 is reduced by means of provision of the second cylindrical sections 85. Thus, the cutting resistance which arises during a finishing operation performed by the hard broaching tool 60 is reduced.

The second embodiment is identical with the first embodiment in terms of other configurations and operation.

Next, a method for manufacturing a variator component of a continuously variable transmission and a variator component of a continuously variable transmission, both pertaining to a third embodiment of the present invention, will now be described by reference to FIG. 8.

Figure 8A:
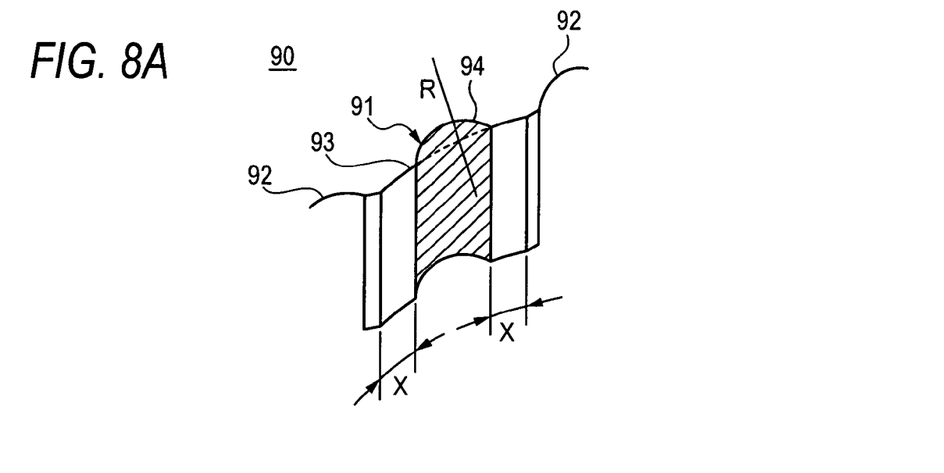
FIGS. 8A, 8B and 8C are enlarged perspective views showing a recess groove formed in an inner radius section of a variator section according to a third embodiment of the present invention.
Figure 8B:
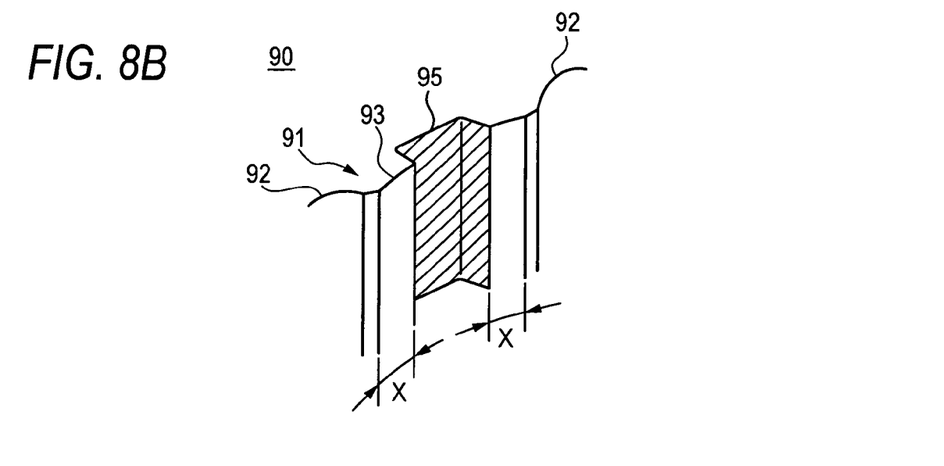
Figure 8C:
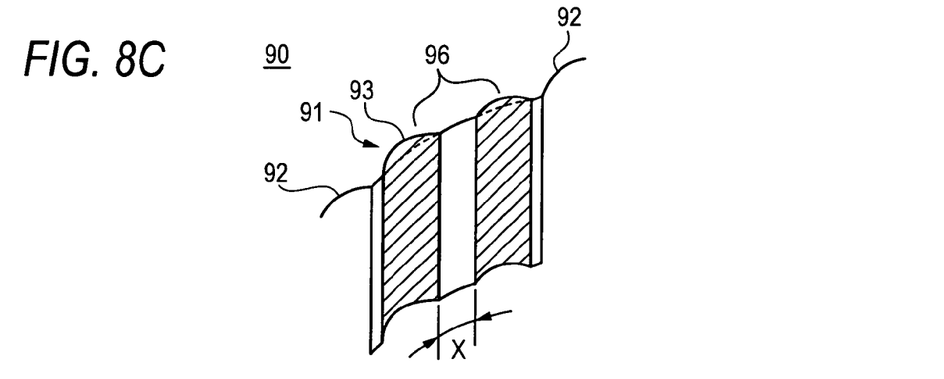

As shown in FIG. 8A, in the third embodiment, a recess groove 94 of the present invention is formed at an intermediate position of a cylindrical section 93 sandwiched between adjacent ball spline grooves 92 in an inner diameter section 91 of an input disk 90 which is a variator component having a plurality of the ball spline grooves 92 (six slots in the embodiment) formed therein. The recess groove 94 is provided so as to be slightly recessed in an outer radial direction with reference to a finished surface of the cylindrical section 93. The recess groove 94 is machined into a circular-arc shape having a curvature radius R by means of broaching before heat treatment. As a result, the range of the area on each cylindrical recess section 93 becomes a total of circular-arc lengths X of the remaining portions of the cylindrical recess section located on both sides of the recess groove 94. The range is set to such an extent that the function of the recess groove as the machining reference to be used for machining functional surfaces is not impaired.

By means of the configuration, one or more recess sections not to be finished are provided in the cylindrical section 93 of the inner diameter section 91 of the input disk 90. Therefore, the outer circumferential length of the inner diameter section to be finished by the hard broaching tool 60 can be shortened. Accordingly, the cutting resistance can be reduced, and finishing operation can be performed through use of the hard broaching tool without involvement of beating vibration.

The recess section can cut simultaneously with machining of the cylindrical sections and the ball spline grooves during the broaching operation before heat treatment. Hence, addition of new processes can be avoided.

The third embodiment is identical with the first embodiment in terms of other configurations and operation.

Here, the shape of the recess groove 94 is arbitrary, so long as the groove is slightly recessed in an outer radius direction with reference to the finished surface. The recess groove 94 may be an angular recess groove 95 shown in FIG. 8B. At least one recess groove 94 can be formed to such an extent that the function of the recess groove as the machining reference to be used for machining functional surfaces is not impaired. Two recess grooves 96 may be formed in one of the cylindrical sections 93, as shown in FIG. 8C.

The present invention is not limited to the above described embodiments and is susceptible to modifications or improvements, as required.

Figure 9A:
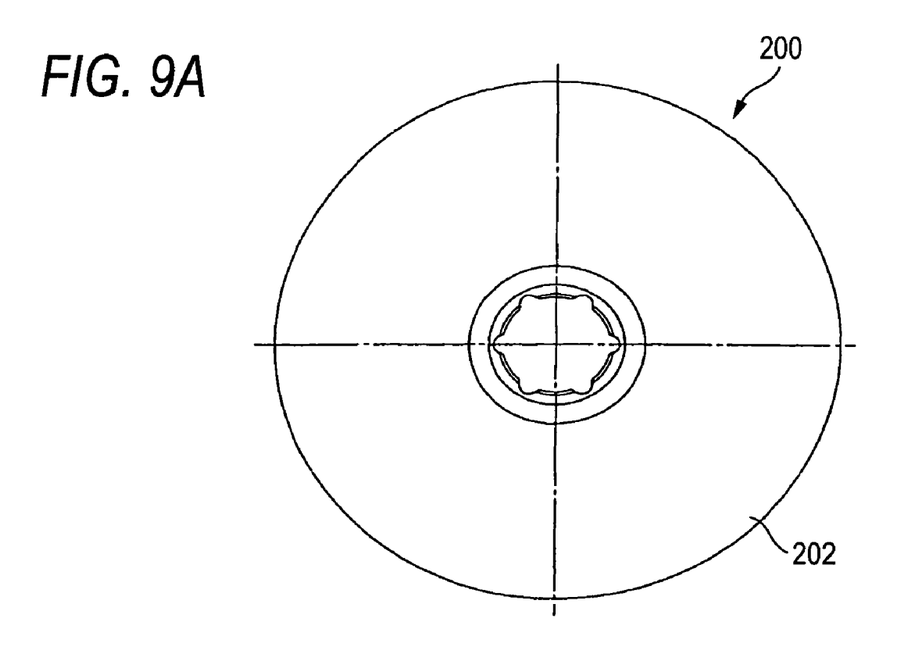
FIGS. 9A and 9B are a planar view and a cross sectional view showing a pulley of a belt-type continuously variable transmission according to another embodiment of the invention.
Figure 9B:
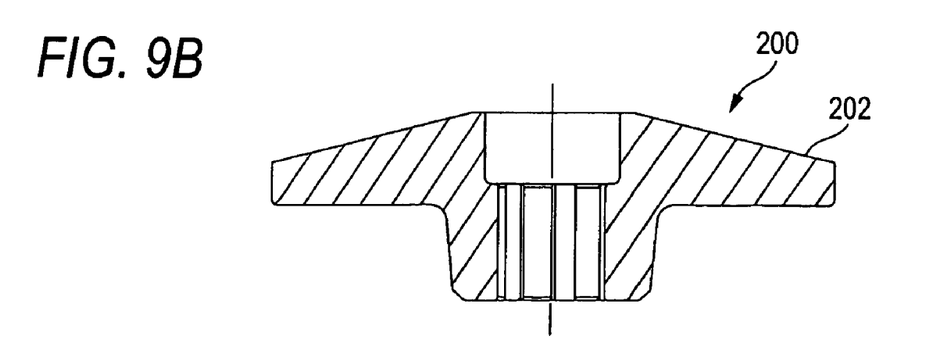

The present embodiments have described the input disks of the toroidal-type continuously variable transmission serving as the variator component of the continuously variable transmission. However, the present invention can also be applied to a pulley 200 of a belt-type continuously variable transmission having, on a side thereof, a pulley surface 202 serving as a functional surface, such as that shown in FIGS. 9A and 9B.

What is claimed is:

1. A method for manufacturing a variator component of a continuously variable transmission having a plurality of cylindrical sections and a plurality of ball spline grooves, which are provided alternately in an inner radial region of the variator component, the method comprising:

simultaneously finishing the cylindrical sections and the ball spline grooves through use of a hard broaching tool;

finishing functional surfaces provided on side surfaces of the variator component while taking the cylindrical sections as a machining reference; and machining a recess section in at least a portion of the cylindrical sections in advance of the step of simultaneously finishing the cylindrical sections and the ball spline grooves;

wherein the recess section is not subjected to finishing operation performed by the hard broaching tool.

* * * * *